(12) United States Patent
Brake et al.

(10) Patent No.: US 6,432,466 B2
(45) Date of Patent: Aug. 13, 2002

(54) FROZEN DESSERT PRODUCTS AND METHOD OF PRODUCTION

(75) Inventors: Nicole C. Brake, Union City; Robert W. Martin, Jr., San Ramon; Scott B. Backinoff, Pleasanton, all of CA (US)

(73) Assignee: Dreyer's Grand Ice Cream, Inc., Oakland, CA (US)

( * ) Notice: Subject to any disclaimer, the term of this patent is extended or adjusted under 35 U.S.C. 154(b) by 14 days.

(21) Appl. No.: 09/759,918

(22) Filed: Jan. 12, 2001

Related U.S. Application Data

(60) Provisional application No. 60/176,269, filed on Jan. 14, 2000.

(51) Int. Cl.⁷ .............................. A23G 9/02; A23G 9/04
(52) U.S. Cl. ...................... 426/565; 426/567; 426/578; 426/393; 426/394; 426/399
(58) Field of Search ................................ 426/565, 567, 426/578, 393, 394, 399

(56) References Cited

U.S. PATENT DOCUMENTS

| | | | |
|---|---|---|---|
| 3,800,036 A | 3/1974 | Gabby et al. | |
| 4,346,120 A | 8/1982 | Morley et al. | |
| 4,400,406 A | 8/1983 | Morley et al. | |
| 4,421,778 A | 12/1983 | Kahn et al. | |
| 4,452,824 A | 6/1984 | Cole et al. | |
| 4,478,867 A | 10/1984 | Zobel et al. | |
| 4,507,326 A | 3/1985 | Tarantino | |
| 4,542,035 A | 9/1985 | Huang et al. | |
| 4,816,283 A | * 3/1989 | Wade et al. | 426/565 |
| 4,840,813 A | 6/1989 | Greenberg et al. | |
| 5,077,076 A | 12/1991 | Gonsalves et al. | |
| 5,082,682 A | 1/1992 | Peterson | |
| 5,084,295 A | 1/1992 | Whelan et al. | |
| 5,171,602 A | * 12/1992 | Martin et al. | 426/567 |
| 5,175,013 A | 12/1992 | Huang et al. | |
| 5,358,728 A | * 10/1994 | Martin et al. | 426/565 |
| 5,482,728 A | 1/1996 | Tapfer et al. | |
| 5,486,372 A | * 1/1996 | Martin et al. | 426/565 |
| 5,690,983 A | 11/1997 | Sponholtz | |
| 5,968,582 A | * 10/1999 | Vahgela et al. | 426/565 |

FOREIGN PATENT DOCUMENTS

| | | | |
|---|---|---|---|
| WO | WO 97/30600 | 8/1997 | |
| WO | WO 00/49883 | * 8/2000 | |

OTHER PUBLICATIONS

W.S. Arbuckle, "Ice Cream," 1977, Avi PUblishing Company, Inc., Westport, CT, USA.

* cited by examiner

Primary Examiner—Nina Bhat
(74) Attorney, Agent, or Firm—Dorr, Carson, Sloan & Birney, P.C.

(57) ABSTRACT

The frozen dessert products of the present invention preferably comprise a base mixture of, on a percent solids (dry) basis, about 1% to about 12% high fructose corn syrup, about 5% to about 20% corn syrup having a DE of about 36, about 2% to about 22% sucrose, about 2% to about 6% maltodextrin, about 0.2% to about 5% egg white, about 1% to about 9% FRUITRIM® blend (comprising fruit juices and natural grain dextrins), about 0.2% to about 1.5% stabilizer, about 0% to about 0.12% emulsifier, about 0% to about 1.5% modified food starch, about 0% to about 5% milk fat, about 0% to about 10% milk solids non-fat (MSNF) with the balance being water, and on a volume basis, from about 20% to about 90% fruit puree. Flavor ingredients may be added. The method of production for the frozen dessert products comprises the steps of blending the above ingredients to form a base mixture, pasteurizing and homogenizing the base mixture, adding fruit puree to form a final mixture, extruding to a final density of about 4.5 to about 8 lbs/gallon, packaging the final mixture, and hardening the final mixture to a core temperature below –10 degrees F.

30 Claims, No Drawings

FROZEN DESSERT PRODUCTS AND METHOD OF PRODUCTION

RELATED APPLICATION

This application claims the benefit of U.S. Provisional Application No. 60/176,269, filed Jan. 14, 2000.

BACKGROUND OF THE INVENTION

1. Field of the Invention

The present invention relates, in general, to frozen dessert products. More particularly, the present invention relates to formulations and methods for producing frozen products for dessert use that provide creamy smooth texture and high fruit delivery.

2. Statement of the Problem

Frozen dessert products enjoy great popularity. Many variations of frozen products have been developed for dessert use, including "sorbet"-type products. Sorbet-type products are particularly popular and have a wide appeal. Distinguishing features of conventional sorbet products are that they are generally composed of a combination of sugar, frozen water, fruit, juice, and perhaps other flavors.

Others have expended considerable effort to develop a sorbet-type product, but such products are unable to deliver both a creamy texture and high fruit delivery. When fruit pieces and fruit puree are added to such products in order to deliver fruit, the usual texture achieved is cold and icy, rather than smooth and creamy.

SUMMARY OF THE INVENTION

The present invention is directed to frozen dessert products having a desirable creamy texture and providing high fruit delivery. In addition, the present invention provides for different embodiments of frozen dessert products. All of these characteristics are obtained by the present invention with simple and straightforward formulations. The use of such simple and straightforward formulations is unexpected and not predictable.

"High fruit delivery" is defined for this description as the ability to provide in the product a strong fruit flavor and a high quantity of fruit in the form of fruit puree and/or fruit pieces.

The frozen dessert product of the present invention is formulated with ingredients that may provide fat, protein, carbohydrates, water, sweeteners, fruit taste, fruit, emulsifier, and stabilizer constituents in a combination that permits the attainment of the desirable properties described above. The attainment with these ingredients of these properties is deemed unexpected and not predictable.

The frozen dessert product of the present invention preferably comprises, on a percent solids (dry) basis, about 1% to about 12% high fructose corn syrup, about 5% to about 20% corn syrup having a DE of about 36, about 2% to about 22% sucrose, about 2% to about 6% maltodextrin, about 0.2% to about 5.0% egg white, about 1% to about 9% FRUITRIM® blend (comprising fruit juices and natural grain dextrins), and about 0.2% to about 1.5% stabilizer. In some embodiments, the frozen dessert product may comprise in addition to the above items, about 0% to about 0.12% emulsifier, about 0% to about 1.5% modified food starch, about 0% to about 10% yogurt culture, about 0% to about 5% milk fat, or about 0% to about 10% milk solids non-fat (MSNF). The product may also be fortified and/or enriched with vitamins, minerals, and fiber.

A method for production of the frozen dessert products is also provided by the present invention. In this method, a base mixture is prepared by placing into a mixer high fructose corn syrup, corn syrup (36 DE), sucrose, maltodextrin, egg white, FRUITRIM® blend, stabilizer, emulsifier (if used), modified food starch (if used), milk fat (if used), milk solids non-fat (if used), and vitamins (if used). The base mixture is agitated for a time to thoroughly mix the ingredients. The base mixture is then pasteurized and homogenized. After these steps, the base mixture is placed in a holding tank for flavoring with, for example, fruit puree, flavor ingredients, and/or fruit mixture. The base mixture and fruit puree or flavor ingredients are blended to form a final mixture and then passed through a scrape surface heat exchanger with final extrusion temperature from 18 degrees F to 23 degrees F. Fruit pieces and bulky flavor ingredients may be added prior to packaging using a conventional fruit feeder. Final product density ranges from about 4.5 to about 8 lbs/gallon. The final mixture is then packaged by conventional methods. The packaged mixture is then hardened for a predetermined period of time to a core temperature below −10 degrees F.

Accordingly, it is an object of the present invention to provide frozen dessert products having a desirable creamy texture. It is another object of the present invention to provide frozen dessert products that have a high fruit delivery. It is a further object of the present invention to provide methods for producing frozen dessert products having the above-identified properties.

These and other advantages, features, and objects of the present invention will be more readily understood in view of the following detailed description.

DETAILED DESCRIPTION OF THE INVENTION

The present invention provides frozen dessert products that provide a creamy texture and high fruit delivery. Methods of production for the frozen dessert products are also disclosed herein. The frozen dessert products can be produced by the methods in a variety of flavors.

Throughout the specification and claims, percentages and ratios are by weight unless otherwise indicated and temperatures are in degrees Fahrenheit unless otherwise indicated.

The frozen dessert products of the present invention generally contain high fructose corn syrup, corn syrup having a DE of about 36, sucrose, maltodextrin, egg whites, FRUITRIM® blend (comprising fruit juices and natural grain dextrins), and stabilizers. In some embodiments, emulsifiers, milk solids non-fat, milk fat, modified food starch, and/or vitamins are present in the formulation. The amount and exact character of each ingredient will depend upon such factors as the character of the other ingredients and the desired nature of the end product. For example, the amount of fat is varied to provide regular and non-fat frozen dessert products. Furthermore, for example, egg whites are added in various amounts to provide a desired texture.

In an important embodiment, the composition of the present invention that can be used to prepare frozen dessert products generally has the following components as set forth in Table I.

TABLE I

| Ingredient | Range (%) |
| --- | --- |
| High Fructose Corn Syrup | 1–12 |
| Corn syrup (about 36 DE) | 5–20 |
| Maltodextrin | 2–6 |
| Sucrose | 2–22 |
| FRUITRIM ® blend (fruit juices and dextrins) | 1–9 |
| Stabilizer | 0.2–1.5 |
| Egg Whites | 0.2–5.0 |
| Fruit puree | 20%–90% by volume |
| Yogurt culture | 0–10 |
| Emulsifier | 0–0.12 |
| Modified Food Starch | 0–1.5 |
| Milk fat | 0–5 |
| Milk Solids Non-fat (MSNF) | 0–10 |
| Water | q.s. |

Milk solids non-fat can be derived from cream, milk (including condensed milk, skim milk, and condensed skim milk), and non-fat dry milk. Milk solids non-fat aid in providing textural properties.

Dairy cream and milk are the preferred fat sources. It is to be understood that other fats can be used in the present invention.

The sweetener ingredients preferably are a combination of high fructose corn syrup, corn syrup, sucrose, maltodextrin, and FRUITRLM® blend that provide a desired level of sweetness and texture to the frozen dessert products. The non-high-fructose corn syrup preferably has a dextrose equivalent (DE) of about 36, which is in the low DE range of corn syrups. Corn syrups possessing a DE of about 24 to about 42 can be used in this invention. Corn syrup of 36 DE may be used in a highly preferred embodiment for ease of processability and satisfactory low-molecular-weight sugar composition.

The stabilizer ingredient may also contribute to the attainment of the desired features of the new frozen dessert products. The stabilizer ingredient is used to improve the ability of the products to withstand commercial shelf life and substantial heat shock without undue deterioration. The stabilizer ingredient may include stabilizers derived from plant gums and animal sources. Other stabilizers may be appropriate for use in the present invention, and such stabilizers will be evident to those skilled in the art and are meant to be included in this description of the frozen dessert products.

FRUITRIM® is the trademark for a liquid, carbohydrate-based blend formed from fruit juice(s) and dextrins from grain(s). FRUITRIM® blend is obtainable from Advanced Ingredients, Inc., 331 Capitola Avenue, Suite F, Capitola, Calif. 95010. The combination of mono- and disaccharides from the fruit juice(s) with selected medium and long-chain dextrins from grain creates a very effective, sweet-tasting ingredient with natural humectancy and low-water activity. FRUITRIM® blend comprises the following, in an approximate analysis: about 78% carbohydrate, said carbohydrate comprising about 50% to about 56% monosaccharides, about 12% to about 16% disaccharides, and about 6% to about 12% higher saccharides; about 18% to about 22% moisture; about 1.0% protein; about 0.7% ash, and about 0.25% fat. FRUITRIM® blend comprises about 78% to about 82% solids. The specific gravity of FRUITRIM® blend is about 11.8 lbs/gallon, and the viscosity is about 4,500 cps to about 22,000 cps at 25 degrees Centigrade and at 80±2% solids. In a second type of analysis, FRUITRIM® blend comprises liquid carbohydrates as: from about 66% to about 74% monosaccharides, from about 12% to about 21% disaccharides, and from about 8% to about 16% other carbohydrates. Under the NLEA, the carbohydrates in FRUITRIM® blend would be divided into the following categories on labels: sugars—76 g/100 g; total fiber—0 g/100 g; other carbohydrates—8 g/100 g.

Water is present in the new frozen dessert products as a dispersion medium for the other ingredients of the product. Water also influences the positive textural characteristics of the present invention. The portion of water in the product is determined on an "as needed" (q.s.) basis to provide the balance of the mixture with reference to a total weight of 100% after the weights of the other ingredients are taken into account. The portion of water that does freeze forms ice crystals that give the product rigidity as well as the refreshing taste perception characteristic of a frozen dessert. The portion of water in the products that remains unfrozen provides balanced texture for the product.

The above ingredients when combined as described in greater detail hereinbelow form a base mixture.

Flavor ingredients can be added to the base mixture if desired. Flavor ingredients are selected from known flavors according to the desired taste, taking into account the other ingredients. Flavor ingredients include, by way of illustration, fruit purees, fruit juices, as well as other flavor ingredients, for example, fruit flavors (such as concentrates or extracts), artificial flavors, yogurt culture, or ascorbic or citric acid. Fruit puree can be any type or combination of pureed fruits, for example, such as strawberry, banana, strawberry-banana, raspberry, peach, mixed berries, and the like. Fruit puree may also contain coloring, flavoring, and/or citric acid. Fruit puree is added as described below from about 20% to about 90% by volume, that is, for example, in one embodiment, when 20% by volume fruit puree is added to the base mix, the final product will contain about 80% by volume of base mix and about 20% by volume of fruit puree. Fruit pieces can be added from about 0% to about 12% by volume. Note, however, that the ingredient ranges specified herein, unless stated otherwise, are for an unflavored product. Those skilled in the art will comprehend the adjustments appropriate for the particular flavor ingredient used.

In addition to the foregoing ingredients, the frozen dessert products of the present invention can include other ingredients if desired, such as, for example, starches, emulsifiers, milk fat, and milk solids non-fat (MSNF). If starches are used in the formulations of the present invention, any modified food starch, such as, for example, corn starch, potato starch, rice starch, or tapioca starch, can be used. The starch used in the compositions of the present invention is preferably modified food starch. Modified starches, when used at low levels (less than about 1.5%), offer improved texture (creaminess) and improved shelf-life (stability) to the frozen dessert products. It is thought that starch molecules organize water in fashion similar to that of hydrocolloid (stabilizer) molecules by obstructing ice crystal growth and/or changing the morphology of ice crystals. Milk fat can be added to enhance creaminess, or other types of fats may be used for the same purpose.

In order to achieve the frozen dessert products of the present invention, a particular method is preferably used. In a preferred method of the present invention, a base mixture is formed by adding the ingredients in Table I above to a kettle provided with an agitating device. The preferred agitating device is a Lanco/Breddo™ high shear mixer/liquefier.

The ingredients in Table I are added to the mixer, and agitation is commenced and continued for a certain period to form a base mixture. The base mixture is then pasteurized via vat under suitable time and temperature conditions, preferably at a temperature of about 165 degrees F for about 30 minutes or by high temperature processing (HTST) at about 180 degrees F to about 200 degrees F for about 30 seconds to about 180 seconds.

The pasteurized base mixture is then homogenized in a conventional two-stage homogenizer. In a preferred embodiment, homogenization comprises a first stage performed at a pressure of about 1,500 psi and a second stage following the first stage, with the second stage performed at about 500 psi.

After pasteurization and homogenization, the base mixture is placed in a holding tank. Fruit puree is then added to the flavoring tank in an amount as desired and blended with the base mixture to form a final mixture. If any other flavoring ingredients are desired to be added, they are then blended into the final mixture. In an alternative embodiment, the fruit puree and flavoring ingredients, if any, are added to the base mixture at the same time. After flavoring, the final mixture is passed through a scrape surface heat exchanger with a final extrusion temperature of from about 18 degrees F to about 23 degrees F. Fruit pieces and bulky flavors may be added prior to packaging using a conventional fruit feeder. For example, bulky flavors may comprise chocolate chips, candy bits, variegate, for example, such as fudge ribbon or chocolate ribbon or caramel ribbon, or nuts, all or any of which can be added to the final mixture before packaging. Final product density ranges from about 4.5 to about 8 lbs/gallon. The final mixture is then packaged using conventional methods. The packaged mixture is then hardened to a core temperature below about −10 degrees F.

Of importance to the present invention, the desired properties of a creamy texture and a high fruit delivery are obtained in the frozen dessert products of this invention with the use of the above-described ingredients in a straightforward combination and method of production. These results are deemed unexpected and advantageous.

The following example of a highly preferred embodiment further illustrates various features of the present invention that are intended to in no way limit the scope of the invention that is defined in the appended claims.

EXAMPLE 1

A batch of frozen dessert product was made by the above-described method comprising from about 20% to about 35% by volume of the base mixture described in Table I above and the following flavor ingredients at the indicated levels:

| Ingredient | Range (% vol/vol) |
| --- | --- |
| Fruit (strawberry) puree | 18–25 |
| Strawberry fruit pieces | 9–15 |
| Fruit (banana) puree | 8–12 |
| Strawberry flavor | 0.14–0.2 |
| Elderberry juice | 0.2–0.25 |
| Ascorbic or citric acid | 0–0.2 |
| Water | q.s. |

In this example, the resulting frozen dessert product has a creamy texture and a high fruit delivery.

Thus, the present invention provides for frozen dessert products having desirable textural and fruit delivery properties and maintaining these desirable properties during shelf life. These results are unexpected when using the ingredients and methods specified herein.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

We claim:

1. A frozen dessert product comprising on a weight basis:
   from about 1% to about 12% of high fructose corn syrup;
   from about 5% to about 20% of corn syrup having a DE of about 36;
   from about 2% to about 6% of maltodextrin;
   from about 2% to about 22% of sucrose;
   from about 0.2% to about 5% of egg white;
   from about 1% to about 9% of a blend of fruit juices and dextrins; and
   from about 0.2% to about 1.5% of stabilizer, with the balance being water.

2. The frozen dessert product of claim 1 further comprising from about 0% to about 0.12% emulsifier.

3. The frozen dessert product of claim 1 further comprising from about 0% to about 1.5% modified food starch.

4. The frozen dessert product of claim 1 further comprising from about 0% to about 5% milk fat.

5. The frozen dessert product of claim 1 further comprising from about 0% to about 10% of milk solids non-fat.

6. The frozen dessert product of claim 1 wherein said blend of fruit juices and dextrins comprises about 50% to about 56% monosaccharides, about 12% to about 16% disaccharides, about 6% to about 12% higher saccharides, about 18% to about 22% water, about 1.0% protein; about 0.7% ash, and about 0.25% fat.

7. The frozen dessert product of claim 1 further comprising a flavor ingredient selected from the group consisting of fruit puree, fruit juice, fruit pieces, yogurt culture, chocolate chips, candy bits, variegate, nuts, and ascorbic acid.

8. The frozen dessert product of claim 7 wherein said fruit puree is present in an amount from about 20% to about 90% by volume.

9. A frozen dessert product comprising on a weight basis:
   from about 1% to about 12% of high fructose corn syrup;
   from about 5% to about 20% of corn syrup having a DE of about 36;
   from about 2% to about 6% maltodextrin;
   from about 2% to about 22% of sucrose;
   from about 0.2% to about 5% of egg white;
   from about 1% to about 9% of a blend of fruit juices and dextrins; and
   from about 0.2% to about 1.5% of stabilizer, with the balance being water; and
   on a volume basis, from about 20% to about 90% fruit puree.

10. The frozen dessert product of claim 9 further comprising from about 0% to about 0.12% emulsifier.

11. The frozen dessert product of claim 9 further comprising from about 0% to about 1.5% modified food starch.

12. The frozen dessert product of claim 9 further comprising from about 0% to about 5% milk fat.

13. The frozen dessert product of claim 9 further comprising from about 0% to about 10% of milk solids non-fat.

14. The frozen dessert product of claim 9 wherein said blend of fruit juices and dextrins comprises from about 50% to about 56% monosaccharides, from about 12% to about 16% disaccharides, from about 6% to about 12% higher saccharides, from about 18% to about 22% water, about 1.0% protein; about 0.7% ash, and about 0.25% fat.

15. The frozen dessert product of claim 9 further comprising a flavor ingredient selected from the group consisting of fruit puree, fruit juice, fruit pieces, yogurt culture, chocolate chips, candy bits, variegate, nuts, and ascorbic acid.

16. A method for producing a frozen dessert product comprising the steps of:
providing a kettle with an agitator;
adding to said kettle high fructose corn syrup, corn syrup having a DE of about 36, maltodextrin, sucrose, egg white, a blend of fruit juices and dextrin, and stabilizer to form a mixture;
agitating said mixture to form a base mixture;
pasteurizing said base mixture;
homogenizing said base mixture;
adding fruit puree to said base mixture to form a final mixture;
passing said final mixture through a scrape surface heat exchanger;
extruding the final mixture at a temperature of from about 18° F. to about 23° F.;
packaging said final mixture; and
hardening said final mixture to a core temperature below about 10° F.

17. The method of claim 16 wherein said pasteurizing step comprises heating said base mixture to about 165° F. for about 30 minutes.

18. The method of claim 16 wherein said pasteurizing step comprises high temperature short time processing at about 180° F. to about 200° F. for about 30 seconds to about 180 seconds.

19. The method of claim 16 wherein said homogenizing step comprises:
a first stage performed at about 1,500 psi; and
a second stage following said first stage, said second stage performed at about 500 psi.

20. The method of claim 16 wherein said final mixture comprises on a weight basis:
from about 1% to about 12% of high fructose corn syrup;
from about 5% to about 20% of corn syrup having a DE of about 36;
from about 2% to about 6% of maltodextrin;
from about 2% to about 22% of sucrose;
from about 0.2% to about 5% of egg white;
from about 1% to about 9% of a blend of fruit juices and dextrins; and
from about 0.2% to about 1.5% of stabilizer, with the balance being water; and
on a volume basis, from about 20% to about 90% fruit puree.

21. The method of claim 16 wherein said final mixture further comprises:
from about 0% to about 0.12% emulsifier;
from about 0% to about 1.5% modified food starch;
from about 0% to about 5% milk fat; and
from about 0% to about 10% of milk solids non-fat.

22. The method of claim 16 wherein after said step of extruding, the final mixture has a density of about 4.5 lbs/gallon to about 8 lbs/gallon.

23. A frozen dessert product produced by the method of claim 16.

24. A frozen dessert product comprising on a weight basis:
from about 1% to about 12% of high fructose corn syrup;
from about 5% to about 20% of corn syrup having a DE of about 36;
from about 2% to about 22% of sucrose;
from about 2% to about 6% of maltodextrin;
from about 0.2% to abut 5% of egg white;
from about 1% to about 9% of a blend of fruit juices and dextrins; and
from about 0.2% to about 1.5% of stabilizer, with the balance being water; and
on a volume basis, from about 20% to about 90% fruit puree;
said frozen dessert product being produced by the method of claim 16.

25. The frozen dessert product of claim 24 wherein said blend of fruit juices and dextrins comprises from about 50% to about 56% monosaccharides, from about 12% to about 16% disaccharides, from about 6% to about 12% higher saccharides, from about 18% to about 22% water, about 1.0% protein; about 0.7% ash, and about 0.25% fat.

26. The frozen dessert product of claim 24 further comprising from about 0% to about 0.12% emulsifier.

27. The frozen dessert product of claim 24 further comprising from about 0% to about 1.5% modified food starch.

28. The frozen dessert product of claim 24 further comprising from about 0% to about 5% milk fat.

29. The frozen dessert product of claim 24 further comprising from about 0% to about 10% of milk solids non-fat.

30. The frozen dessert product of claim 24 further comprising a flavor ingredient selected from the group consisting of fruit puree, fruit juice, fruit pieces, yogurt culture, chocolate chips, candy bits, variegate, nuts, and ascorbic acid.

* * * * *